(12) United States Patent
Mochizuki (10) Patent No.: US 6,924,600 B2
(45) Date of Patent: Aug. 2, 2005

(54) LASER PLASMA GENERATION METHOD AND STRUCTURE THEREOF

(76) Inventor: Takayasu Mochizuki, 6-40-3, Honmachi, Shibuya-ku, Tokyo (JP)

( * ) Notice: Subject to any disclaimer, the term of this patent is extended or adjusted under 35 U.S.C. 154(b) by 175 days.

(21) Appl. No.: 10/410,269

(22) Filed: Apr. 10, 2003

(65) Prior Publication Data

US 2003/0194055 A1 Oct. 16, 2003

(30) Foreign Application Priority Data

Apr. 11, 2002 (JP) ........................................ 2002-109587

(51) Int. Cl.[7] .............................. H01J 7/24; H05B 31/26
(52) U.S. Cl. .............................. 315/111.21; 315/111.71; 372/55; 372/58; 372/76
(58) Field of Search .............................. 372/55, 58, 76, 372/109; 315/111.21, 111.71; 378/119, 120, 143

(56) References Cited

U.S. PATENT DOCUMENTS

| | | | | |
|---|---|---|---|---|
| 4,663,567 A | * | 5/1987 | Wong ..................... | 315/111.21 |
| 5,577,092 A | * | 11/1996 | Kublak et al. .............. | 378/119 |
| 5,636,239 A | * | 6/1997 | Bruesselbach et al. ........ | 372/70 |
| 5,640,408 A | * | 6/1997 | Jani et al. ...................... | 372/41 |
| 5,978,407 A | * | 11/1999 | Chang et al. .................. | 372/72 |
| 6,002,744 A | * | 12/1999 | Hertz et al. .................. | 378/119 |
| 6,275,565 B1 | * | 8/2001 | Tomie ......................... | 378/119 |

FOREIGN PATENT DOCUMENTS

| | | |
|---|---|---|
| JP | 2000-509190 | 7/2000 |
| WO | WO 97/40650 | 10/1997 |

OTHER PUBLICATIONS

L. Rymell, et al., "X–ray and EUV laser–plasma sources based on cryogenic liquid–jet target", SPIE vol. 3676, Part of the SPIE Conference on Emerging Lithographic Technologies III, pp. 421–424, Santa Clara, California, Mar. 1999.

Björn A. M. Hansson, "Xenon liquid–jet laser–plasma source for EUV lithography", Proceedings of SPIE, vol. 3997, In Emerging Lithographic Technologies IV, pp. 729–732, (2000).

* cited by examiner

*Primary Examiner*—Wilson Lee
*Assistant Examiner*—Leith Al-Nazer
(74) *Attorney, Agent, or Firm*—Foley & Lardner LLP (57) ABSTRACT

In laser-plasma generation, a fluid of target material is jet out to form a jet tube target 21 having a diameter $\phi$ and a wall thickness $\tau$ with a shell and a hollow space within the shell by using a core-column. A plurality of pulse-like laser beams 30 are directed to the jet tube target radially and equiangularly-spaced directions and are simultaneously focused and irradiated onto the jet tube target to generate the plasma.

19 Claims, 6 Drawing Sheets

LASER PLASMA GENERATION METHOD AND STRUCTURE THEREOF

This application claims priority to prior application JP 2002-109587, the disclosure of which is incorporated herein by reference.

BACKGROUND OF THE INVENTION

The present invention relates to a laser-plasma generation method and its structure in which a target material that is fluid at least in one of liquid and solid states is ejected from a nozzle to form a column-like jet flow and then irradiated by focused pulsed lasers composed of at least single beam to generate a high-temperature high-density plasma that emits high-average power x-ray which is useful for x-ray material processing, x-ray lithography, and material analysis. In particular, the present invention relates to a laser-plasma generation method and its structure which provides a method that can supply with target continuously at a small gas emission rate, and which can enhance the x-ray conversion efficiency.

The effort has been made to realize a practical laser-plasma x-ray source in order to use x-rays from a high-temperature plasma that is produced from a target and heated by irradiating a high peak power laser. It is desirable to obtain an x-ray conversion efficiency as high as possible in the focus spot area of the heating laser beam in order to achieve a high-brightness x-ray source. On the other hand, a higher plasma density is favorable to obtain a higher x-ray conversion efficiency. For this purpose a method has been developed as a mean supplying the target that prepares the target material in a fluid state of a gas phase or a liquid phase which is ejected as a jet flow through a nozzle into a vacuum chamber and then heated by a focused laser beam. With this method, a continuous supply of the target material is relatively easy, thus a high average power x-ray source will be achieved by using a high repetition rate pulsed laser.

Use of a supersonic gas jet flow has been popular as the ejected jet flow. However, since this jet flow is a gas flow a number density of target molecules at the upper stream of the nozzle is smaller in two orders of magnitude than a solid state density and a divergence angle of the ejected flow is as large as 30 angular degree, thus lowering a target density significantly at the laser focus spot which is well separated from the nozzle exit. This results in a degraded x-ray conversion efficiency compared to the case when using the target of solid state where an x-ray conversion efficiency is defined as a fraction of the laser energy converting to an energy of emitting x-rays. Therefore it is being tried to generate higher density plasmas by placing the laser focal spot several millimeters down from the nozzle exit. But this causes erosion of the nozzle metal surface, resulting in emission of metal debris from the nozzle.

In order to solve this problem a method was proposed to produce a jet flow consisting of molecular clusters that is formed by ejecting the target gas which is cooled down at the upper stream of the nozzle, thus being condensed to a high density very close to liquid density. With this method it is expected that the target density is enhanced by molecular clustering at the nozzle exit and a smaller divergence of the flow. But the divergence angle does not become small enough in practice. For example, when the laser focus spot is placed 10 mm down the nozzle exit, the ejected flow is in a state of spray so that the density of the target molecules is not high enough to obtain a required x-ray intensity.

On the other hand, compared with the supersonic gas jet flow above described, a droplet target guarantees a target of liquid density at the laser focus spot with a minimum mass of the target material. However, there are serious problems regarding stabilities in their size and trajectories.

Furthermore a high-velocity and a precise synchronization with the laser pulse in time are required for the droplet target to be operated at a high repetition rate because the distance between one droplet and the next one has to be large enough not to destruct the next one due to plasma particles and/or scattered laser beam, and the focused laser beam has to hit the droplet center precisely in time and space.

Figure 1:
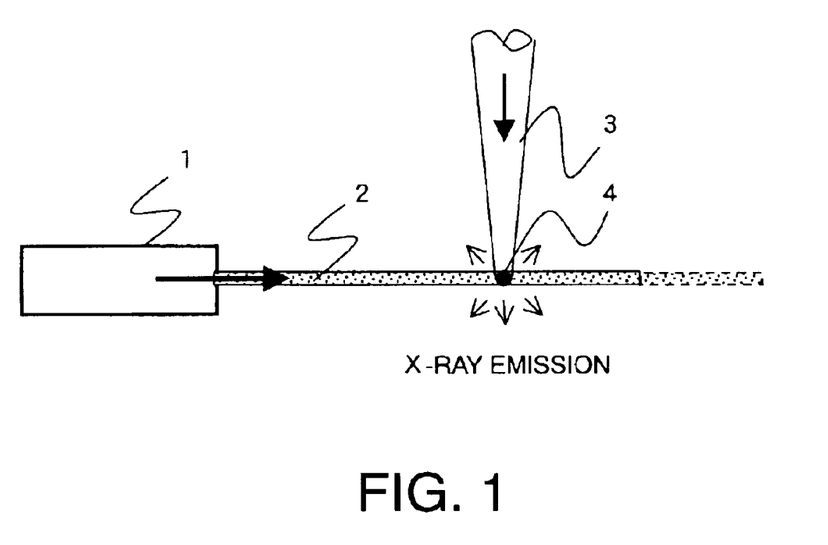
FIG. 1 is a view describing one embodiment of conventional x-ray generation structure using a liquid target.

Thus, use of a continuous high-velocity liquid jet flow would be a most straight-forward method to solve the above problems. For example, in the method disclosed in a Japanese patent application file (JP-A) 2000-509190, a target generation mean 1 ejects a liquid continuously, generating a jet-flow target 2 as shown in FIG. 1. A laser beam 3 is focused and irradiated on a focus spot 4 that is placed at a spatially continuous part of the jet-flow target 2, thereby ionizing the jet-flow target 2 to produce a plasma that emits x-rays.

On the other hand, it has been proposed to use low-temperature Xenon for a liquid-jet laser-plasma x-ray source, for example by B. A. M. Hansson et al (In Emerging Lithographic Technologies IV, Proceedings of SPIE Vol.3997, 2000). According to their report, a diameter of the liquid Xe jet flow is limited in less than 40 $\mu$m because of evacuation capacity of their vacuum pump and likely because of hydrodynamic instability, and the position of the focus spot needs to be confined only in the range of continuous liquid flow.

In solid droplet or liquid jet targets, laser heating of the target induces a strong pressure impulse that drives a shockwave heating inside the target, while only radiation outgoing from the ablation plasma heated by the laser pulse is being used as the x-ray source. On the other hand, the hydrodynamic energy carried by shockwaves, compression waves etc. is dissipated in the target, causing the debris emission and/or massive evaporation in the surrounding target material.

Enhancement of the x-ray conversion efficiency has been tested by using cavity-structured targets. A pulsed laser beam was introduced through an inlet hole to irradiate the cavity inside surface. The cavity structure would confine at least one of x-rays and plasma particles produced by laser heating in the cavity. The elongation of x-ray emission pulse duration was observed and some enhancement of the brightness in the emission from the hole was confirmed.

As is above described, a droplet target can provides a liquid or solid density at the laser focus spot so that a higher x-ray conversion efficiency is obtained compared to gas jet targets. However, it is not easy to control their sizes, trajectories, velocities and repetition rate in a stable manner. Furthermore it is doubtful to use droplet targets at a high repetition rate operation because a high velocity and a precise timing of the droplets are required as above described On the other hand, in the case of a liquid jet target the mass of target material consumed can be reduced by reducing a diameter of the column-like jet flow. But the diameter of the jet needs to be as large as the focus spot diameter of the laser in order to obtain a sufficient x-ray conversion efficiency. Otherwise, the laser beam interacts with the under-dense region of an expanding plasma so that the laser energy is not well absorbed and the ion density thereof is relatively low. Thus it tends to generate relatively lower intensity emission. Accordingly, the x-ray emission intensity in this case is less than expected from consumption of target material compared to the case of droplet target. This means that a much larger quantity of target gas is generated in a vacuum chamber for x-ray source than expected from the x-ray power obtained.

In cavity target, an overall x-ray conversion efficiency might be enhanced because the laser energy absorption rate is improved in the cavity plasma of a relatively large scale-length, and the energy of the plasma particles confined in the cavity will be converted into the radiation energy during a confinement time. But, in addition to the difficulty in supplying the cavities at a fast rate the x-ray flux emitted from the outlet hole of the cavity is much limited by the size of the hole. The x-ray energy available through the cavity hole is very little compared to the x-ray energy which will be dissipated in heating and ablating the inside wall of the cavity. The ablation front driven by x-rays proceeds into the cavity wall, ionizing the wall material, thereby dissipating its energy.

When the target gas generated is not well evacuated, the pressure in the vacuum chamber rises so that the x-ray emitted from the target plasma is absorbed by neutral gas molecules of target material which stay at the region surrounding the source point. Therefore the x-ray intensity which is usable outside the chamber is attenuated. We need vacuum pumps of huge evacuation capacity to avoid the above attenuation.

The purpose of the present invention is to provide with a method of laser-plasma generation and its structure in which the above problems can be solved; a quantity of the target mass gasified is sufficiently small even when the initial density of target is a liquid or solid density and furthermore the x-ray conversion efficiency can be improved.

SUMMARY OF THE INVENTION

The present invention relates to a laser-plasma generation method and its structure in which a target material that is fluid is ejected from a nozzle to form a continuous column-like jet flow and then irradiated and heated by a series of focused pulsed laser beam to generate a high-temperature high-density plasma. In order to solve the above problems, the present invention uses a target that has a hollow shell with a wall thickness and is named as a jet tube target hereunder.

To form the jet tube target, one is to place a core column in the central portion of a single target ejection opening for a target material at the edge of the nozzle so that the area of the nozzle opening becomes annular. The other is to allocate plural target ejection openings along an annular zone, thus a hollow-structured target jet will be formed by a set of the target material flow which is ejected from each of nozzles simultaneously. It is desirable that an outer diameter of the jet tube target is as large as a laser spot diameter. The wall thickness of the target is as large as or more than an ablation thickness. Here the ablation thickness is defined as the thickness of a target layer that will be ablated outward and lost as a plasma heated by a laser beam. The thickness should be optimized by taking into account the x-ray energy generated and the quantity of target gas generated. Besides as x-ray radiation energy which is released outwards from the ablating plasmas, the laser beam energy absorbed at the cutoff density region of the plasma is dissipated as kinetic and thermal energies of ablated plasmas and a hydrodynamic energy that drives the target inwards. The former will dissipate into the vacuum as the plasma expands outwards. The latter energy includes an inward kinetic energy of the whole target which is driven by shockwaves and/or compression waves.

The conversion efficiency to the kinetic energy of the target can be expressed as a function of $\Delta M/M$ assuming a rocket model in the ablation flow, where $\Delta M$ is a target mass ejected outwards by ablation, and M is an initial total mass of the target. In the present invention, the wall thickness of the target is adjusted to be as large as the ablation thickness as described above. Therefore, we do not suffer from unnecessary target gas which is discharged otherwise from the inner part of the target without making any contribution to x-ray generation while we can obtain such x-ray emission from ablating plasma under laser irradiation as that from the conventional jet target.

On the other hand, when the wall thickness of the target is thicker than the ablation thickness a fraction of the wall material which is left at the end of the ablation is accelerated like a rocket by reaction of ablation and then hydrodynamically focused in a two-dimensional symmetry into the axis of the target to collide with each other. Therefore, the kinetic energy of the wall above described is converted to an internal energy of plasma by collisions and then inertially confined. During confinement period the internal energy accumulated in the high-temperature high-density plasma is released as x-ray radiation energy.

As above described, usual targets do not have a layer being accelerated into a hollow space so that most of the absorbed laser energy will be dissipated outwards as kinetic and thermal energies of plasma particles as the plasma expands into the vacuum, while only a small fraction of the absorbed energy is converted to x-ray radiation energy during laser heating. Compared to the above described targets, the target structure in the present invention has a function to re-convert a fraction of kinetic energy of plasma particles into radiation energy.

In the present invention, in order to obtain sufficient compression and heating of the plasma during two-dimensional focusing of the jet tube target, it is desired that the target is irradiated by several laser beams as uniformly as possible from different directions whose angle separations are equal in the plane normal to the target axis. This is also desirable in order to avoid a bending of the target jet which will be caused by unbalanced laser ablative acceleration.

DESCRIPTION OF THE PREFERRED EMBODIMENTS

Now, embodiments of the present invention will be described referring to figures. The figures used are only for illustration to explain the present invention so that the dimensions including sizes of components and configurations are partially exaggerated, thus not accurate.

And the jet tube target with a hollow shell may be a flow of solid state material which has been solidified immediately after it was ejected from the nozzle opening. But, for convenience we assume that the jet tube target is in a cylindrical column which is of a most effective shape in the embodiments described hereunder.

Figure 2:
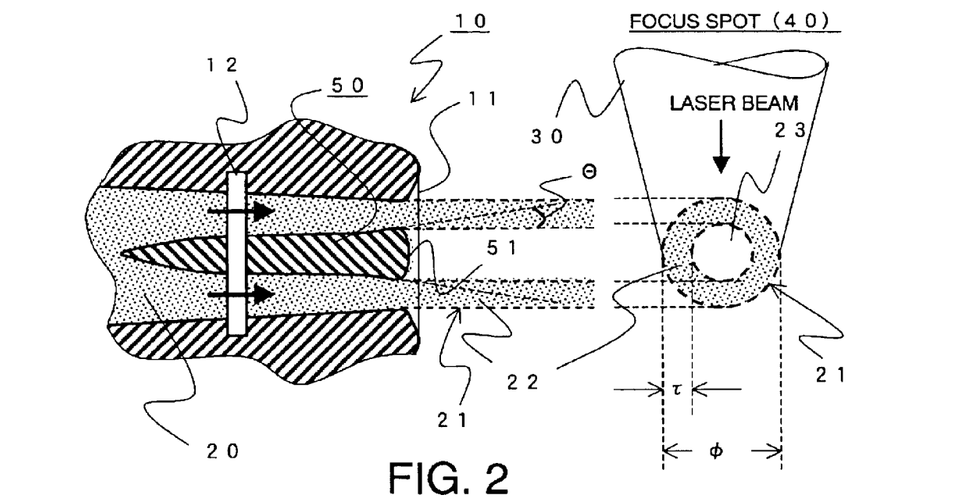
FIG. 2 is a sectional view for describing one embodiment on the structures relating to the present invention.

FIG. 2 is a block diagram of function for describing one embodiment according to the present invention.

In the laser plasma generation method illustrated in FIG. 2, a jet tube target 21 is formed by ejecting a target material 20 of liquid state and/or half solid state, for example of high viscosity, from a nozzle 10 inside a vacuum chamber. Then by focusing and irradiating a continuously pulsed laser beam 30 on the jet tube target a plasma will be produced at a focus spot point 40.

The nozzle has a cylindrical space at the central axis, a target ejection opening 11 at the edge, and a flow rectifier 12 inside. In the cylindrical space of the nozzle 10, a wedge-shaped core column 50 having a circular cross-section is mounted on the flow rectifier 12 with its edge at the target ejection opening 11. Thus a cross-sectional area of the target ejection opening 11 in a plane vertical to the axis has an annular shape like a donut.

The cylindrical space in the nozzle 10 has a narrow throat near the target ejection opening 11 for ejecting the target material 20. Accordingly in the nozzle 10 the target material 20 in the cylindrical space is driven by the flow rectifier 12 and ejected as a column-like jet flow from the target ejection opening. The flow rectifier 12 provides with a pressure for the jet tube target to be formed with a sufficient velocity, and drives the target material 20 to be ejected continuously.

The core column has a tapered angle theta on the outer surface, thereby narrowing the target ejection opening 11 to help forming the jet tube target 21. Thus the jet tube target 21 will become a jet flow having a wall 22 and a hollow space 23.

Therefore the inner surface of the target ejection opening 11 and the outer surface of the core column 50 which contact with the target material 20 are needed to be smooth as much as possible. Furthermore, the surface curvatures around the nozzle exit including the above described slope angle are determined depending upon an ejection speed of the target material 20 driven by the flow rectifier 12 so as to keep a hollow shell structure without changing its diameter during a flight of long distance.

There is no problem even if the fluid target material ejected from the target ejection channel is cooled down by evaporation at the surface, thereby solidified immediately. In this sense the forming process of the jet tube target in the present invention can be said to be extruding and forming.

A diameter of the light source for x-ray lithography is generally assumed to be 200–1000 $\mu$m. Therefore the jet tube target should be formed with a diameter of 0.1–1.0 mm.

The target is irradiated by a pulsed laser beam with a pulse duration of 10 ns and an intensity of $10^{11}$–$10^{12}$ W/cm$^2$. A wall thickness of the target is set as 20–30 $\mu$m because an ablation thickness is about 20 $\mu$m. This means that the aspect ratio, radius divided by wall thickness, can be 5–30. Accordingly, a mass flow rate of the target material can be less than one hundredth of the case without a hollow shell structure.

Here, a mechanical structure and a configuration required for the nozzle and the core column are described referring to FIG. 2.

Each part of the nozzle 10 and the core column 50 is temperature-controlled to obtain the jet tube target of a required diameter by ejection. In the case when the ejected target 21 is solidified, this process is similar to the ejection molding of a hollow or gas-filled fiber.

As described above, the core column 50 is tapered to the edge 51 with a gradual expansion of a slope theta. This gives outward momentum against the central axis to the ejected fluid so that the hollow space 23 covered by the wall 22 of the jet flow is not collapsed by a surface tension of the fluid. It is especially effective when there exists residual gas pressure in the vacuum chamber. When a force by a vapor pressure of the target material inside the hollow space prevails the surface tension, resulting in expansion of the jet tube target as it travels, the tapered angle may be inverse in its sign.

Figure 3:
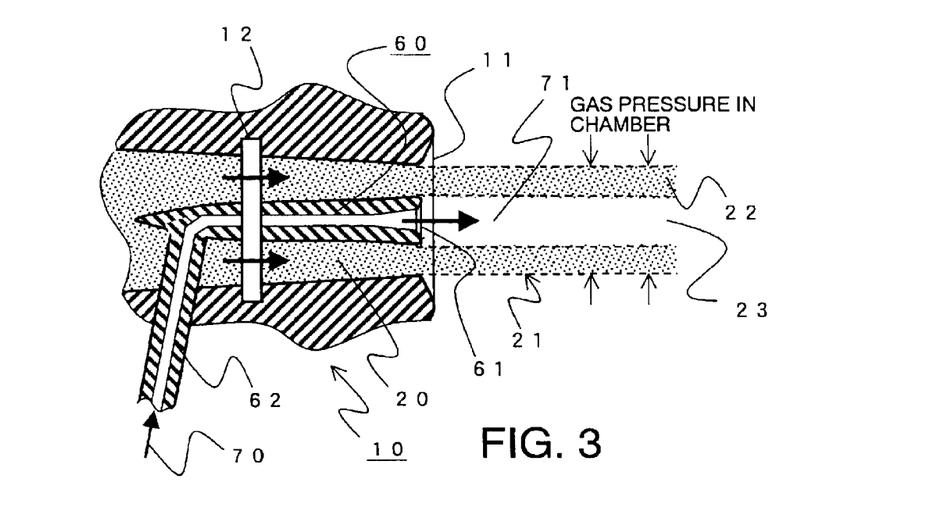
FIG. 3 is a sectional view for describing one embodiment in which a part of FIG. 2 is modified and improved.

Next, referring to FIG. 3 more stable formation of the jet tube target 21 is described. The structure of the core column 60 in FIG. 3 is different from that in FIG. 2.

The core column 60 comprises a gas ejection opening 61 and a gas supply channel 62 at the center inside. A gas 70 is supplied with a pressure through the gas supply channel 62 from the other edge and ejected as an ejected gas 71 from the gas ejection opening 61 so as to form the hollow space 23 inside the target material 20 ejected from the target ejection opening 11.

The ejected gas 71 gives a stationary pressure outward in the hollow space 23. Therefore, it is possible to stabilize the shape of the jet tube target by adjusting the pressure of the gas 71 because a surface tension of the target 20 and a gas pressure inside the vacuum chamber can be compensated by the stationary outward pressure. The gas 70 must be kept in a temperature lower than that of liquidizing the jet tube target 21. When a force by a vapor pressure of the target material inside the hollow space prevails the surface tension, resulting in expansion of the jet tube target as it travels, the gas supply channel 62 can be used as an evacuation channel to evacuate the vapor of the target material inside the hollow space.

A set of parameters to embody the above case is quoted as follows. For example, the pressure at upstream of the nozzle is 1–5 MPa, velocity of the jet is 1–50 m/s, the inner diameter of the nozzle opening; the outer diameter of the jet tube target is 0.1–1.0 mm, the outer diameter of the core material; the inner diameter of the jet tube target is 0.06–0.9 mm, the inner diameter of the gas supply channel is 30–300 $\mu$m, and the length of the nozzle is 1–10 mm where it is the effective length to form the jet flow around the ejection opening. The gas supplied inside the jet tube target is desirable to be low-temperature Helium gas when the target material is Xenon in liquid or solid state.

Figure 4:
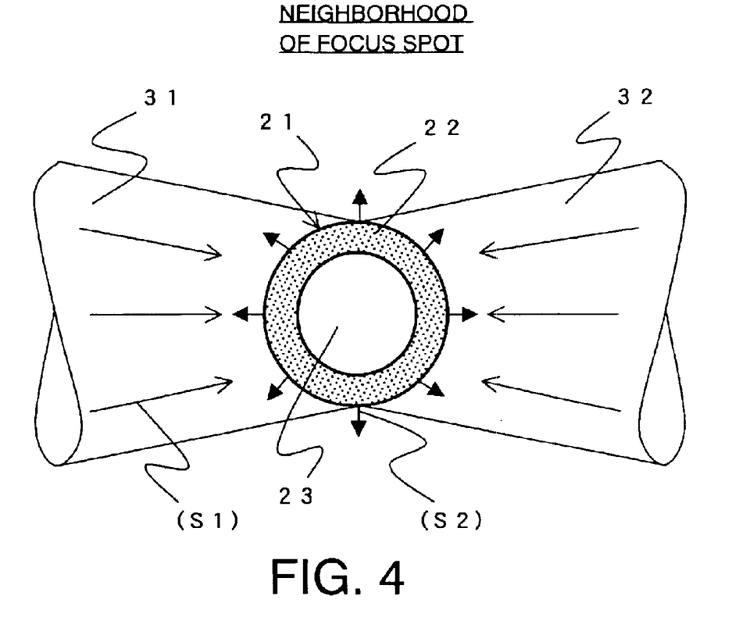
FIG. 4 is a cross-sectional view for describing one embodiment of the target at the laser focus spot when the laser beam irradiates the target.
Figure 5:
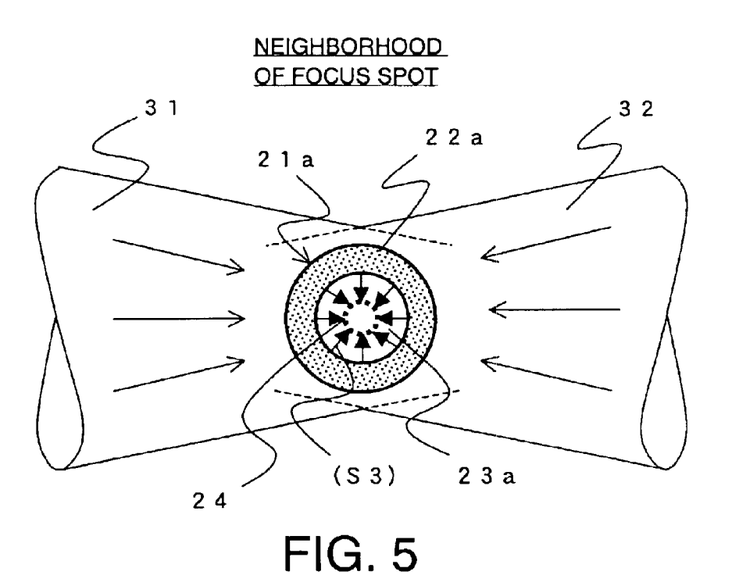
FIG. 5 is a view for describing the state of the target at a time later than that of FIG. 4.

Next, referring to FIG. 4 and FIG. 5, one of embodiments in the case that the jet tube target 21 is irradiated by laser beams is described.

In FIG. 4 which shows a cross-sectional view of the jet tube target, two laser beams 31 and 32 irradiate the wall 22 from right and left hand sides, respectively, whose directions are symmetrically located in a plane vertical to the axis of the jet tube target 21; step S1. Consequently the target material in the wall 22 is heated from both of right and left hand sides to generate a high-temperature high-density plasma, radiating x-ray in all of solid angle; step S2.

Next, as shown in FIG. 5, in order to make the kinetic energy stored in a target material 22a emitted as x-ray radiation energy it is desirable to focus the target material 22a at the hollow space 23a which has been left after the wall 22 was ablated and accelerated; step S3. From this result a high-temperature high-density plasma 24 is produced again at the center of the hollow space 23a.

Thus, in order to obtain a plasma of higher density it is needed to achieve an two-dimensional uniform compression to the central axis by heating the wall 22 by irradiating laser beams allocated as uniformly as possible in focusing directions, not only in two directions as shown in FIG. 4.

For example, three pairs of laser beams which are irradiated from two directions opposing to each other are distributed with an equal angle separation of 60 degrees on an illumination plane including the focus spot and perpendicular to the axis of the jet tube target. Further uniform heating by laser can be achieved by increasing a number of the laser beam pair.

It is also desirable to use odd number laser beams which are distributed uniformly in space angle so that each laser beam does not penetrate into the focusing optics of the opposing beam, making optical damages on the laser source sending the beam.

It is further desirable to tilt the axis of each laser beam against the illumination plane to one of two faces of the plane, thereby any optical axis of even number beams can not coincide with others. Thus the beam does not penetrate into the focusing optics of the opposing beam. With the tilted angle, the odd number laser beams which may be reflected at the outer surface of the column-like target plasma will not be directed to the optics of neighborhood beam.

When the jet tube target which was formed as a liquid jet flow was ejected into a vacuum and solidified due to evaporation cooling to become a solid fiber, a shearing force will appear at the edge of the fiber to the direction normal to the axis.

In this case, the above described shearing force gives an effect to bend the trajectory of the fiber target which is continuously ejected from the nozzle and travels in the vacuum chamber. That is when one laser beam irradiates the fiber target at the focus spot to produce a plasma there, a shearing force works to the direction vertical to the axis of the fiber target which is in contact with the plasma. Accordingly the trajectory of the target being transferred to the focus spot for the next laser shot will be deflected so that it will not be able to reach the laser focus spot. Thus a plasma can not be produced by the next pulsed laser beam.

Therefore, especially in the case of a fiber target the directions of laser beams are desired to be allocated in symmetry in a plane normal to the axis of the fiber target. Symmetrical irradiation will make a resultant shearing force effectively zero and enables two-dimensional uniform compression.

Figure 6:
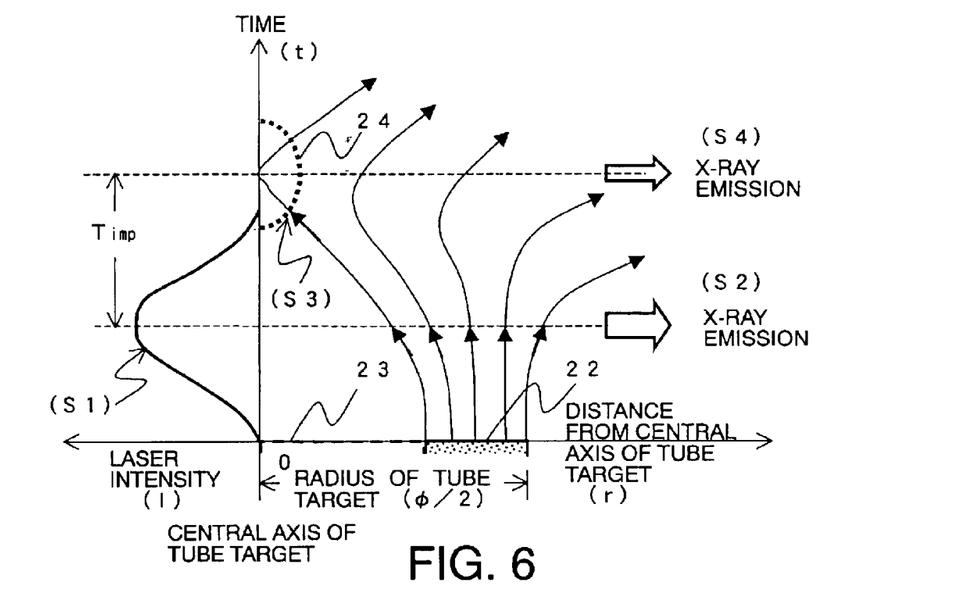
FIG. 6 is a chart of the target material flow in time and space.

Next, referring to FIG. 6 and FIG. 7 in addition to FIG. 2, generation process of x-ray emissions will be described in details. In FIG. 6, stream lines are illustrated which show the travel of the target materials as a function of time under laser irradiation.

A target material near the surface of the wall 22 in the jet tube target 21 which is formed as shown in FIG. 2 is heated by a laser beam 30 in the step S1 to produce a plasma. In the step S2, x-rays are emitted from a high-temperature high-density plasma generated there.

The target material is ablated from the outer surface of the jet tube target 21 by focusing and irradiating a laser beam 30. The ablation produces a reaction force that accelerates an inner part of target material in the wall 22 to the hollow space 23, thereby focusing and compressing the target material into the center. Accordingly, as the step S3 an implosion takes place at the central axis of the jet tube target 21, forming a stagnated hot plasma that is compressed at the central part.

There are two modes in the implosion as described hereunder.

One is called an ablative implosion. When the wall thickness of the target is sufficiently thick and the plasma ablates from the outer surface, the inner target material kept at a low temperature is accelerated and compressed to the central axis.

The other is called an explosive implosion. When the wall thickness of the target is relatively thin and the laser intensity on the target is very high, a whole target material of the wall is instantly ionized to become a hot plasma where a converging shockwave is generated and focused into the central part. The shockwave will heat the gasified target material and compress it to the central axis.

The target material compressed 2-dimensionally in the step S3 is converted into a stagnated plasma of high-temperature and high-density 24 at the central axis of the jet tube target 21 by inertial confinement. Thus x-ray is emitted from the stagnated plasma 24 as the step S4.

Next, x-ray conversion efficiency is roughly estimated.

It is known from the experimental results that a total radiation conversion efficiency $\eta_R$ which is a fraction of total radiation energy against the laser energy amounts about 30% in a plasma generated in a solid target that is irradiated by a 1 μm laser beam with a intensity of $10^{12}$–$10^{14}$ W/cm$^2$, while an x-ray conversion efficiency $\eta_X$ for the center wavelength 13–14 nm with a bandwidth (BW) 2%, is about 1%. These are time-integrated ratios against the incident laser beam energies. On other hand, ratios of the energy which dissipates as reflected laser beam energy and as plasma particle energy are 20% and 50%, respectively.

When the high-temperature high-density plasma formed at the center after compression does survive due to inertial confinement effect for more than a period that is required for radiation to take place, an effective conversion of plasma particle energy to x-ray radiation energy occurs in the plasma.

If the ratio of the energy which the plasma particles obtain after compressed by the implosion is assumed to be about 50% of the total plasma particle energy, then a ratio of the energy which the plasma particles have in the hollow space is expressed as $0.25E_L$ where $E_L$ is a laser pulse energy. When a 40% of this energy should be converted to radiation energy, $\eta_X$ would be 1.3%; that is, a multiplication of 1.3. It is needless to say that these should have optimum values which depend on a laser pulse shape, a laser intensity, and material and size of a target.

Figure 7:
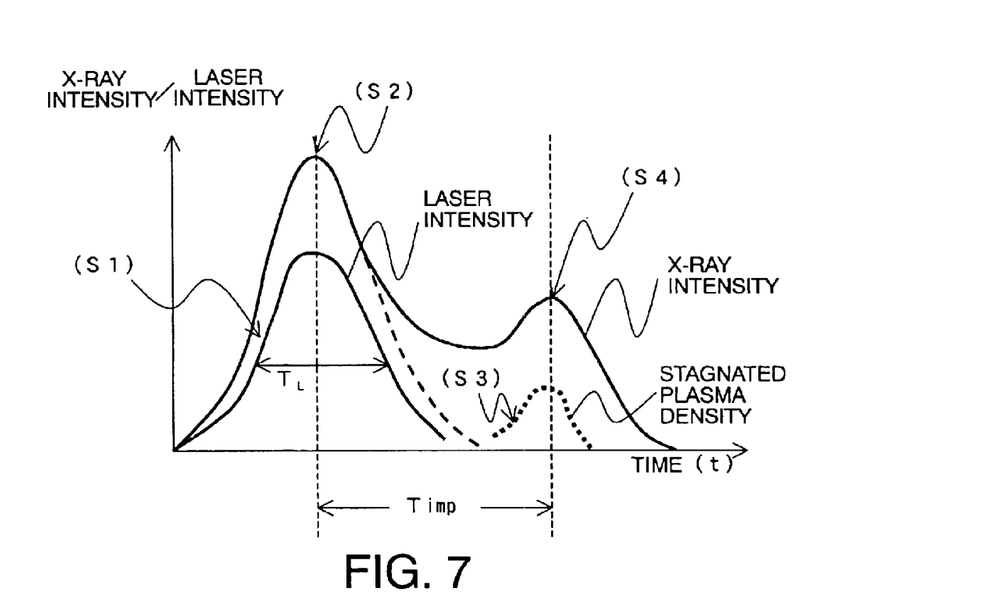
FIG. 7 is a view for describing temporal histories of x-ray emission intensity, laser intensity and density of the stagnated plasma.

That is, as is shown in FIG. 7, the x-ray output has a longer duration than a pulse duration $T_L$ of the laser beam and has a second peak after the implosion time $T_{imp}$.

In the above description, the cross-sectional area of the target ejection opening has been assumed to be annular, but the same effect will be fully obtained even with a noncircular ring if the target material ejected should form the hollow shell tube structure.

Figure 8A:
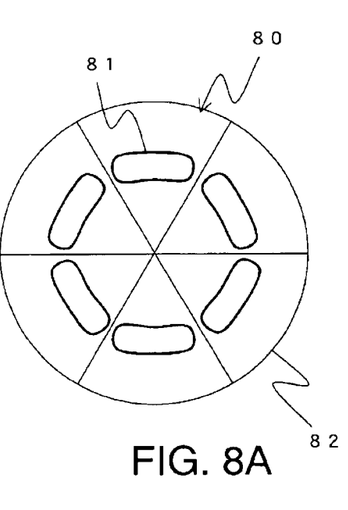
FIG. 8A is a view for describing a cross-sectional pattern of one embodiment at the edge of the nozzle which has plural target ejection openings.
Figure 8B:
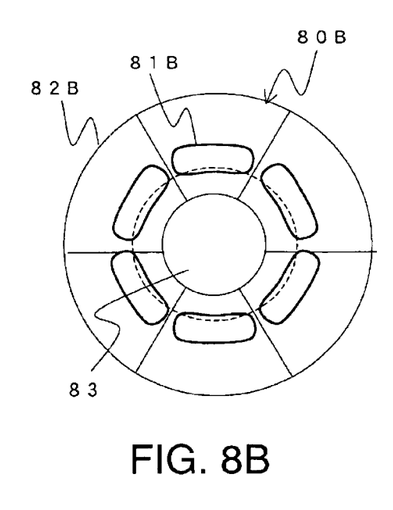
FIG. 8B is a view for describing a cross-sectional pattern of one embodiment using a column at the center.

Next, referring to FIG. 8, a structure of the nozzle 80 and a shape of the target ejection opening 81 are described, which are different from that described previously referring to FIG. 2 and FIG. 3.

At the edge of the nozzle 80 which is shown in FIG. 8A, plural target ejection openings 81 are allocated in an annular circle with equal separations. Target materials ejected from each of plural openings 81 are unified with each other in the space to form an approximate jet tube target.

Such plural ejection openings 81 may form a segmented structure consisting of plural subdivided nozzles 82 which have an identical taper cross-section. Each of the subdivided nozzle 82 illustrated has one target ejection opening.

At the edge of the nozzle 80B which is shown in FIG. 8B, plural target ejection openings 81B are allocated in an annular circle with equal separations as described above except for that each of the segmented nozzle 82B has a trapezoid shape, and they are mounted around a central column 83 at the central axis.

In FIG. 8A or FIG. 8B, the target ejection opening has a cross-sectional area of a rectangular shape which is elongated along the annular circle, and it is located at the center of the subdivided nozzle. The subdivided nozzle may have a mechanical interface by which it is assembled with the central column as shown in FIG. 8B.

The nozzle having plural target ejection openings may also consist of cylindrical subdivided nozzles each of which has a thin target ejection opening and is mounted around the central column 83.

The shapes of various ejection openings which were described above, are determined by characteristics of fluid, for example, viscosity, surface tension, sizes and jet velocity, etc.

Figure 9:
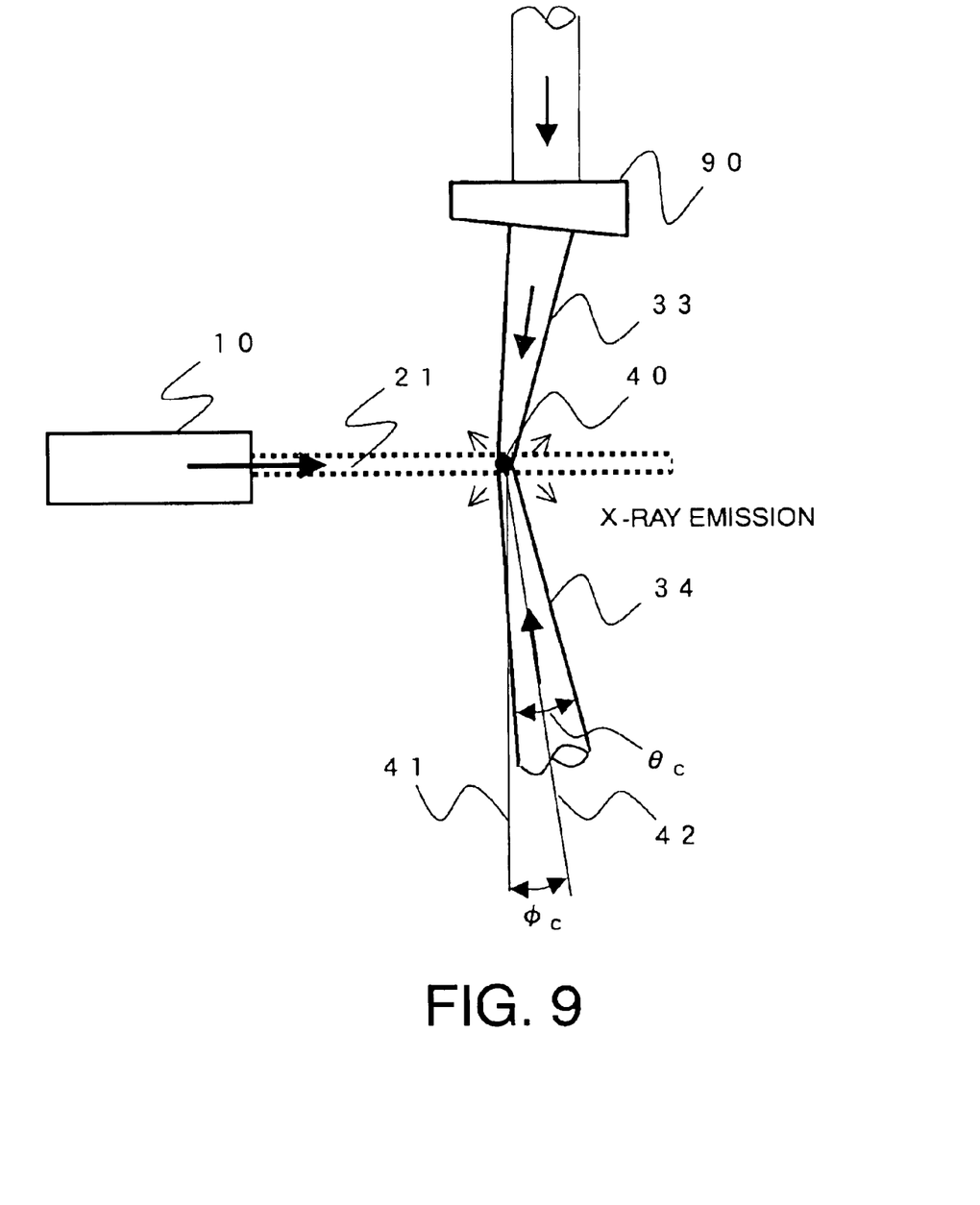
FIG. 9 is a view describing one embodiment of an x-ray generation structure providing a nozzle and a beam focusing and irradiating device, and using a jet tube target in this invention.

Referring to FIG. 9, a structure for generating a plasma comprises a nozzle 10 for jetting out the fluid of the target material to form the jet tube target 21 as described above. And the structure further comprises a device 90 for focusing and irradiating a laser beam 33 onto the focusing point 40 of the jet tube target 21, and a similar device for focusing a laser beam 34 with a focusing corn angle θc. These devices direct the optical axes of the laser beams in order that they may cross each other at the focusing point 40.

When the laser beams 33 and 34 are of even number and radially and inwardly directed with optical axes whose directions projected on an illumination plane 41 including the focus point 40 and perpendicular to the central axis of said jet tube target are equiangularly spaced from each other on the plane 41, the optical axes 42 of the beams 33 and 34 have a tilted angle $\phi_c$ from the plane 41, that is, they cross each other with a crossing angle of $2\phi_c$, in order that each of the beams 33 and 34 does not penetrate into the opposing laser source through the device 90, making optical damages therein. The $\phi_c$ is 3–15 deg.

The above descriptions present appropriate data, referring respective figure. But, the shape, size, configuration, composition, and combination are changeable as far as the functions above described are fulfilled though they are related with each other. Therefore, the present invention is not limited within the embodiments described above.

According to the present invention described above, the amount of target material required at the laser focus spot is reduced because of a hollow shell tube structure so that the target gas emission which is inevitable for x-ray generation is significantly reduced as well. Therefore the evacuation capacity and a target recycle system are minimized in size.

Furthermore, by irradiating the jet tube target uniformly in two-dimensional symmetry, x-ray emission is obtained from a core plasma produced at the central axis. Therefore, the x-ray conversion efficiency effectively increases, thus making a driver laser more compact.

Accordingly, a compact, low equipment-cost, low running-cost laser-plasma x-ray generator will be realized.

What is claimed is:

1. A method for laser plasma generation, comprising the steps of:

preparing a target material of at least one of liquid and solid states;

jetting out said target material from a nozzle so as to make a jet tube target, which has a single cylindrical shell comprising a flow of said target material and defining a hollow space within said shell; and focusing and irradiating a laser beams onto said shell for heating said target material to generate a high-temperature high-density plasma due to said target material.

2. A method for laser plasma generation according to claim 1, wherein said nozzle comprises a single ejection opening in an annular shape surrounding a core column, said target material being ejected from said single ejection opening to form said jet tube target with said hollow space defined by said core column.

3. A method for laser plasma generation according to claim 2, wherein said nozzle further comprises a gas supply channel formed in said core column at the center thereof and wherein, in said target material jetting-out step, said hollow space is maintained within said jet tube target either by a gas jetted out from said gas supply channel along a central axis of said jet tube target or by evacuating the vapor of the target material inside the hollow space through said gas supply channel.

4. A method for laser plasma generation according to claim 1, wherein said nozzle comprises a plurality of ejection openings, which are arranged at angularly-spaced positions in an annular zone of said nozzle, said target material being jet out from said plurality of ejection openings to form a plurality of jet streams of said target material, said jet streams are spatially unified to form said jet tube target.

5. A method for laser plasma generation according to claim 1, wherein, in the focusing and irradiating step, said laser beam is adjusted to have, at a focus spot, a beam diameter equal to an outer diameter of said jet tube target.

6. A method for laser plasma generation according to claim 5, wherein, in the focusing and irradiating step, said jet tube target is subjected to repetition of pulse-like laser irradiation.

7. A method for laser plasma generation according to claim 6, wherein, in each time of the repetition of the pulse-like laser irradiation, different pulse-like laser beams are simultaneously directed to a point on a central axis of said jet tube target around said tube target.

8. A method for laser plasma generation according to claim 7, wherein said different pulse-like laser beams are radially and inwardly directed and equiangularly spaced from each other on a plane including to said point and perpendicular to said central axis of said jet tube target.

9. A method for laser plasma generation according to claim 6, wherein the shell of said jet tube target is formed with an average wall thickness in said target material jetting-out step, and wherein a particular portion of the jet tube target is subjected to one of the repetition of the pulse-like laser beam irradiation in the laser focusing and irradiation step, whereby the target material in the wall thickness of the shell in the particular portion is almost all ablated.

10. A method for laser plasma generation according to claim 9, wherein, in the laser focusing and irradiation step, said pulse-like laser beam is adjusted in the strength so that the target material in the wall thickness of the shell in the particular portion is almost all ablated.

11. A structure for generating a high-temperature high-density plasma comprising a nozzle for jetting out a target material, which is of at least one of liquid and solid states, to form a jet tube target, which has a single cylindrical shell comprising a flow of said target material and defining a hollow space within said shell, and a beam focusing and irradiating device for focusing and irradiating a laser beam onto said shell to heat said target material to thereby generate the high-temperature and high-density due to said target material.

12. A structure claimed in claim 11, wherein said nozzle comprises a core column, and a single ejection opening of an annular shape surrounding said core column, said target material being ejected from said single ejection opening to form said jet tube target with said hollow space defined by said core column.

13. A structure for generating a high-temperature high-density plasma according to claim 12, wherein said nozzle further comprises a gas supply channel formed in said core column at the center thereof for jetting out a gas therefrom so as to maintain said hollow space within said jet tube target.

14. A structure according to claim 11, wherein said nozzle comprises a plurality of ejection openings, which are arranged at angularly-spaced positions in an annular zone of said nozzle so that, when said target material is jet out from said plurality of ejection openings, a plurality of jet streams of said target material are formed and are spatially unified to form said jet tube target.

15. A structure according to claim 14, wherein said nozzle comprises a plurality of ejection openings as subdivided nozzles, which are unified and formed to an annular cross-sectional area as a single opening.

16. A structure according to claim 11, wherein said nozzle is adapted to form the jet tube target having an outer diameter equal to a beam diameter at a focus spot of the laser beam.

17. A structure according to claim 11, wherein each of said beam focusing and irradiating device repeatedly generates a pulse-like laser beam, so that said jet tube target is subjected to repetition of pulse-like laser irradiation.

18. A structure according to claim 11, wherein, said laser beam focusing and irradiating device generates different pulse-like laser beams in each time of the repetition of the pulse-like laser irradiation, said different pulse-like laser beams being simultaneously directed to a point on a central axis of said jet tube target around said tube target.

19. A structure according to claim 18, wherein said different pulse-like laser beams are radially and inwardly directed and equiangularly spaced from each other on a plane including to said point and perpendicular to said central axis of said jet tube target.

* * * * *